Patented July 19, 1932

1,867,942

UNITED STATES PATENT OFFICE

MAX HAGEDORN AND GEORG HINGST, OF DESSAU IN ANHALT, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

CELLULOSE ESTERS OF HIGH MOLECULAR ORGANIC ACIDS AND PROCESS OF MAKING THE SAME

No Drawing. Application filed February 12, 1929, Serial No. 339,484, and in Germany February 11, 1928.

The present invention is based on the observation that esters of cellulose soluble in organic solvents can be made by treating in the presence of an organic base, such as pyridine or quinoline, and at a temperature, raised above 100° C. in the course of the process, a cellulose material containing esterifiable hydroxyl-groups with halides, preferably chlorides, of acids containing in their molecule a cyclic radical, such as alicyclic carboxylic acids, and of fatty acids substituted by a cyclic radicle.

For instance the chlorides of following acids are adapted for the process: phenylacetic acid, or carboxylic acids of the cyclopentane and cyclohexane series, such as a naphthenic acid.

Another object of our present invention is to provide mixed cellulose esters containing in their molecule besides an organic acid residue of the group mentioned above other organic acid residues. When starting, for instance, from a cellulose acetate still containing esterifiable OH groups and when performing the reaction as described above, a mixed cellulose ester is obtainable, esterified by acetic acid and by an organic acid containing a cyclic radicle. Furthermore, we may use simultaneously or successively as an esterifying agent a halide of an alicyclic carboxylic acid or of a fatty acid substituted by a cyclic radicle and a halide of a higher fatty acid having more than eight carbon atoms in the molecule, such as lauric acid, palmitic acid, stearic acid or ricinoleic acid.

The cellulose material, such as a cellulose which has not been pre-treated or a cellulose which has for instance undergone a pre-treatment but contains still more esterifiable hydroxyl-groups, for instance, a cellulose ester such as cellulose acetate or a cellulose ether such as ethyl-cellulose, is treated with the said esterifying agent under the conditions indicated above.

The organic base is preferably used in an amount not essentially surpassing the equivalent of the acid halide applied.

In this process, while esterifying with only one acid halide or with more than one acid halide simultaneously or successively, the temperature may be maintained lower than 100° C. and then raised and maintained above 100° C. until the desired solubility of the ester has been attained. For this purpose it is possible, but not necessary to isolate the insoluble ester primarily formed. Preferably the reaction mixture is heated to a temperature above 100° C. mostly between 100 and 200° C. with the same result the esterification may be conducted at a temperature above 100°, generally between 100 and 200° C. The process may be executed in several phases, for instance one may esterify the cellulose material with one acid halide below 100° C. and then with another acid halide above 100° C. When the primarily formed insoluble ester is to be heated in order to alter its solubility and so as to complete the reaction, compounds, such as an acid, an acid anhydride, an acid halide, a salt of a powerful acid with a feeble base or a mixture of such agents may be added.

For each ester there is a temperature limit below which the esterification leads to an insoluble ester, whereas above that temperature a soluble ester is obtained. The temperature limit varies for the individual acids, but generally it does not fall below 100° C.

In the indicated operation, a diluent may be used, preferably a solvent for the ester to be obtained.

In order to ensure a smooth course of the reaction, it is advantageous to heat the mixture as rapidly as possible. The reaction is finished as soon as fibers can be no more detected in the mixture. Generally, this occurs after one to three hours. The ester formed is then precipitated from the mixture by means of an alcohol, such as methanol or ethanol, or acetone and washed and dried.

The cellulose esters made by the present process are soluble in aromatic hydrocarbons, chlorinated hydrocarbons, esters of aliphatic acids. They swell in ether and in aliphatic hydrocarbons. The solubility to a certain degree depends on the quantity and the nature of the substituents being present in the cellulose molecule.

The soluble cellulose compounds containing radicles of alicyclic carboxylic acids are solid and very hard at room temperature. At a moderately raised temperature, that is to say for instance at 50° C., these esters melting at about 200° C., soften and become mouldable. On account of this property they may be worked up without the use of a solvent or softening agent.

The new esters are suitable to be used for all purposes, where cellulose derivatives are employable. They may be worked up for instance, into threads, films, lacquers, masses which can be spread with a knife, coatings on paper or fabric, insulating masses, plastic masses and the like. They may be moulded by pressure at a raised temperature below their melting point.

*Example 1.*—A mixture of 700 cc. of phenylacetyl chloride and 200 cc. of chlorobenzene is slowly poured into a mixture of 480 cc. of technical pyridine bases (boiling at 115–145° C.) and 1500 cc. chlorobenzene. Into the liquid are introduced at 80° C. 100 grams of cotton-linters. While stirring, the mass is heated for one hour at 115–120° C., the cotton thus being dissolved. The mixture is poured into methanol and the sticky mass thus precipitated is four times boiled with methanol. The product contains 77 per cent of phenylacetic acid chemically bound, is hard and brittle when cold, softens at 80–100° C. and melts at about 140° C. It dissolves in hydrocarbons of the benzene series and in halogenated aliphatic hydrocarbons.

*Example 2.*—100 grams of cellulose are introduced into a mixture of 700 cc. of chlorobenzene, 400 cc. of naphthenic acid chloride (boiling under 12 mm. pressure at 95–120° C.) and 200 cc. of α-picoline and warmed on the vapor-bath during 3 hours. An insoluble cellulose naphthenate is formed becoming soluble by heating the reaction-mass at 135° C. during 20 minutes. From the cold mixture the ester is precipitated by acetone and then purified by extraction with methanol. The ester dissolves in benzene, dichloromethane, chloroform, ether, ethylacetate, and swells strongly in benzine.

*Example 3.*—A mixture of 1083 cc. of lauryl chloride and 253 cc. of phenylacetyl chloride is added to a mixture of 2500 cc. of xylene and 513 cc. of technical pyridine bases. Into this liquid at 80° C. 100 grams of cotton-linters are introduced, the reaction-mixture then during 2 hours being maintained at 130° C. It is thereupon poured into methanol and the precipitated and settled mass is four times boiled with methanol. The cellulose-phenylacetate-laurate is soluble in hydrocarbons of the benzene series and in halogenated aliphatic hydrocarbons.

*Example 4.*—100 grams of cotton are introduced into a mixture of 409 grams of lauryl chloride, 265 grams of technical pyridine bases and 2300 cc. of chlorobenzene. The mass is heated during 12–20 hours on a water-bath. 270 grams of naphthenic acid chloride and 180 grams of technical pyridine bases are added, and the mass is then heated while stirring during 1–3 hours at 110–120° C. The pulp-like mass is introduced into ethanol and the precipitated ester is extracted with ethanol. The cellulose-laurate-naphthenate softens a little above 50° C. It dissolves in aromatic and in halogenated aliphatic hydrocarbons.

*Example 5.*—100 grams of an insoluble cellulose acetate containing 36 per cent. of chemically bound acetic acid are allowed to swell in a mixture of 1500–2000 parts of chlorobenzene and 120 parts of technical pyridine bases while being warmed. 400 parts of naphthenic acid chloride are added and the mass heated at 110–120° C. until the complex ester has attained the desired solubility in chloroform and benzene. The pulp-like mass is worked up as usual by precipitation with alcohol.

*Example 6.*—100 grams of cellulose are alkalized at an ordinary temperature by 2670 parts of sodium hydroxide solution of 50 per cent. strength. After 2 hours the mass is pressed until its weight corresponds to 283 parts and finely ground. After standing 18 hours at ordinary temperature in a closed vessel to the alkali-cellulose there are added 200 parts of benzene, 47 parts of powdered sodium hydroxide and 300 parts of chloroethane, and the mixture is heated during 6 hours in an autoclave at 120° C. The mass is diluted with 200 parts of benzene and acetic acid is added until a strong acid reaction appears. Then 70 parts of technical pyridine bases and 133 parts of naphthenic acid chloride are introduced and the mass is heated while stirring during 3 hours at 80° C. The cellulose derivative obtained contains 40–43 per cent. of ethoxyl and 20–25 per cent. of radicles of naphthenic acid. The ethyl-cellulose naphthenate easily and clearly dissolves in aromatic and in chlorinated aliphatic hydrocarbons. It is more difficult to scratch a film prepared from this material than to scratch a film made from pure ethyl-cellulose.

The process, in which under the same circumstances unaltered cellulose is acted upon with only one halide of a higher fatty acid, is the object of the application Ser. No. 243,759 filed December 29th, 1927. This process is not claimed in the present application.

Also the process of esterification is not claimed which has to be applied when hydrocellulose or hydroxycellulose is used as the starting material.

We claim:

1. Process of producing a mixed cellulose ester containing radicles of a higher fatty acid and naphthenic acid and being soluble in aromatic hydrocarbons and chlorinated aliphatic hydrocarbons, which process comprises acting upon cellulose containing esterifiable hydroxyl-groups with a higher fatty acid chloride and naphthenic acid chloride in the presence of an organic base and raising the temperature above 100° C. in the course of the process.

2. Process of producing a mixed cellulose ester containing radicles of a higher fatty acid and naphthenic acid and being soluble in aromatic hydrocarbons and chlorinated aliphatic hydrocarbons, which process comprises acting upon cellulose containing esterifiable hydroxyl-groups below 100° C. with a higher fatty acid chloride and naphthenic acid chloride in the presence of an organic base and heating the insoluble ester thus formed to a temperature above 100° C.

3. Process of producing a mixed cellulose ester containing radicles of a higher fatty acid and naphthenic acid and being soluble in aromatic hydrocarbons and chlorinated aliphatic hydrocarbons, which process comprises acting upon cellulose containing esterifiable hydroxyl-groups below 100° C. with a higher fatty acid chloride and naphthenic acid chloride in the presence of an organic base and heating the reaction mixture thus formed to a temperature above 100° C.

4. Process of producing a mixed cellulose ester containing radicles of lauric acid and naphthenic acid and being soluble in aromatic hydrocarbons and chlorinated aliphatic hydrocarbons, which process comprises acting upon cellulose containing esterifiable hydroxyl-groups with lauryl chloride and naphthenic acid chloride in the presence of an organic base and raising the temperature above 100° C. in the course of the process.

5. Process of producing a mixed cellulose ester containing radicles of lauric acid and naphthenic acid and being soluble in aromatic hydrocarbons and chlorinated aliphatic hydrocarbons, which process comprises acting upon cellulose containing esterifiable hydroxyl-groups below 100° C. with lauryl chloride and naphthenic acid chloride in the presence of an organic base and heating the insoluble ester thus formed to a temperature above 100° C.

6. Process of producing a mixed cellulose ester containing radicles of lauric acid and naphthenic acid and being soluble in aromatic hydrocarbons and chlorinated aliphatic hydrocarbons, which process comprises acting upon cellulose containing esterifiable hydroxyl-groups below 100° C. with lauryl chloride and naphthenic acid chloride in the presence of an organic base and heating the reaction mixture thus formed to a temperature of above 100° C.

7. Mixed cellulose esters containing the radicles of a higher fatty acid and of naphthenic acid, said mixed esters being soluble in aromatic hydrocarbons and chlorinated aliphatic hydrocarbons.

8. Mixed cellulose esters containing the radicles of lauric acid and of naphthenic acid, said mixed esters being soluble in aromatic hydrocarbons and chlorinated aliphatic hydrocarbons.

In testimony whereof, we affix our signatures.

MAX HAGEDORN.
GEORG HINGST.